United States Patent [19]
Flentge

[11] Patent Number: 5,511,039
[45] Date of Patent: Apr. 23, 1996

[54] METHOD OF PERFORMING HIGH RESOLUTION CROSSED-ARRAY SEISMIC SURVEYS

[75] Inventor: David M. Flentge, Houston, Tex.

[73] Assignee: Western Atlas International, Inc., Houston, Tex.

[21] Appl. No.: 71,515

[22] Filed: Jun. 3, 1993

[51] Int. Cl.$^6$ .............................. G01V 1/20; G01V 1/36
[52] U.S. Cl. ................................................ 367/56; 367/58
[58] Field of Search ........................................ 367/56, 58

[56] References Cited

U.S. PATENT DOCUMENTS

| | | | |
|---|---|---|---|
| 2,329,721 | 9/1943 | Hoover et al. | 367/58 |
| 3,746,122 | 7/1973 | Davis | 367/58 |
| 3,793,620 | 2/1974 | Miller | 367/56 |
| 4,001,770 | 1/1977 | Hofer | 367/56 |
| 4,476,552 | 10/1984 | Waters et al. | 367/58 |
| 4,597,066 | 6/1986 | Frasier | 367/50 |
| 4,677,598 | 6/1987 | Johnson | 367/56 |
| 4,742,497 | 5/1988 | Beasley et al. | 367/52 |
| 4,758,998 | 7/1988 | Johnson et al. | 367/58 |
| 4,933,912 | 6/1990 | Gallagher | 367/56 |
| 5,029,145 | 7/1991 | Marsden et al. | 367/56 |
| 5,257,241 | 10/1993 | Henderson et al. | 367/15 |
| 5,402,391 | 3/1995 | Cordsen | 367/56 |

OTHER PUBLICATIONS

Ritchie, W; 61st Annv. Seg Mtg., Nov. 10, 1991, v–1, pp 750–753; abst only herewith.

Buchholtz, H.; Circum–Pacific Counc. Energy Mineral Resources et al, Beijing China, Sep. 20, 1984, vol. 10, pp 737–752; abst. only enclosed herewith.

*Primary Examiner*—Nelson Moskowitz
*Attorney, Agent, or Firm*—Charles R. Schweppe

[57] ABSTRACT

This invention provides a method for performing three dimensional seismic surveys. In one configuration, receiver lines containing equally spaced receiver stations run in one direction while the source station lines run diagonal to the receiver station lines. The receiver stations and/or the source stations are offset to obtain a desired spatial sampling (number of bins) or multiplicity of the common mid points. In an alternate configuration, the receiver line spacing is offset by a fraction of the source station spacing and/or the source line spacing is offset by a fraction of the receiver station spacing to obtain the desired spatial sampling. These configurations provide higher spatial sampling (smaller bins) compared to the conventional geometries. The smaller bins may be combined to obtain folds (multiplicity) which is sufficient to provide desired seismic imaging while preserving the benefits provided by the higher spatial sampling by the method of the present invention.

6 Claims, 3 Drawing Sheets

METHOD OF PERFORMING HIGH RESOLUTION CROSSED-ARRAY SEISMIC SURVEYS

BACKGROUND OF THE INVENTION

1. Field of the Invention

This invention relates generally to seismic prospecting, and more particularly to a method of performing seismic surveys on land.

2. Description of Related Art

In seismic exploration, to obtain information relating to the sub strata located below the earth's surface, seismic signals in the form of pressure or shock waves are induced into the earth. These shock waves propagate through the substram beneath the earth's surface where they are reflected by the subterranean interfaces back to the earth's surface. The reflected waves are detected by a plurality of spaced apart receivers placed on the earth's surface which convert the reflected waves into signals. A geophone or a group of geophones is typically used as a receiver. The signals are recorded to provide maps of the substram. Seismic sources, such as seismic vibrators and/or explosive devices, are used to produce shock waves.

In recent years, three dimensional ("3D") seismic surveys have become very common for they provide more comprehensive information about the earth's subsurface compared to the conventional two dimensional ("2D") surveys. However, 3D surveys require the use of a complex surveying geometry and produce significantly more dam compared to the two dimensional surveys. Three dimensional surveys are typically performed using what is called a "swath method." In the swath method, a plurality of very long (3000–6000 meters) receiver lines, each containing a plurality of uniformly spaced apart receivers (receiver stations), are placed in parallel on the earth's surface (terrain) which is to be surveyed. Each receiver defines a single receiver point on the receiver line. The data gathering equipment limitations and other economic considerations frequently define the number of receiver lines and the number of receivers on each line that can be used to perform the survey. After placing the receiver lines, a seismic source such as a seismic vibrator or an explosive device is activated at predetermined spaced-apart locations (source stations) to impart desired shock waves in the earth. The source stations are placed along source lines which run midway between the receivers.

A typical prior art three-dimensional survey geometry is shown in FIG. 1. A plurality of receiver lines 20a, 20b . . . 20r, each containing a plurality of equally spaced apart receivers 22 are placed in parallel on the earth's surface. A source is activated at predetermined source stations, such as point 24, placed along source lines or shot lines 26a, 26b . . . 26n which run perpendicular to the receiver lines 20a–20n. The source lines typically lie at the middle of adjacent receiver. This provides a symmetrical crossed-array geometry wherein shot lines are orthogonal to the receiver lines 20. The resultant seismic traces (seismic data) are recorded corresponding to the common midpoints ("CMP") for the source points and the receivers. Once the source has been activated at each of the predetermined source points and the resultant data recorded, the swath is moved to an adjacent terrain and the above-noted process is repeated.

In the prior art seismic survey geometries, the receivers on all the receiver lines are equidistant and all lines are symmetrically placed, i.e., the source lines are placed midway between the receivers, as shown in FIG. 1. Such a geometry provides seismic data (traces) for common midpoints, which correspond to cells or bins having the dimensions of one-half (½) the spacing between adjacent receivers on the receiver lines and one-half (½) the spacing between adjacent source points along the source lines. For example, if the receivers and the source points are each fifty (50) meters apart, each bin will be twenty-five by twenty-five (25× 25) meters. And each bin has seismic data corresponding to one common midpoint. The resultant bins obtained from the survey geometry of FIG. 1 are shown in FIG. 1A. Each solid lined square 28 indicates the bin size and the center 29 of each such cell represents the common mid point associated with that bin.

During operation, each source point produces seismic traces for a row of common midpoints. As the source is moved, the midpoints overlap. The data for each midpoint is collected for all shots and the data common to a midpoint is added or stacked to obtain better definition of data for each common mid point. The spacing between the receivers and the shot points, i.e., the bin size, defines the spatial resolution. The spatial resolution of such prior art methods may be improved by reducing the bin size by decreasing the receivers and/or shot point spacings, which increases the equipment cost, operational time to perform the survey and the data processing time. Also in the prior art methods, the bins are sufficiently large and may not be appropriately combined ("macrobinned"), for example, when data from certain CMP's is either not recorded due to physical configuration difficulties or equipment failure.

It is therefore highly desirable to have a method of geophysical prospecting which provides small data bins (higher spatial resolution) compared to the prior art bins ("standard" cells or bins) without substantially increasing the cost of the equipment or requiring additional operational time while allowing to preserve the benefits of the standard cells.

The quality of result obtained from conventional seismic data processing techniques, such as stacking, dip moveout correction and migration depends upon the spatial interval (bin size) which is limited by the data gathering methods. When a smaller bin size is desired, the prior art survey would need to be performed again using a narrower grid (smaller receiver and/or source spacing), which is sometimes not possible due to the nature of the terrain or is cost prohibitive. On the other hand, it is highly desirable to perform seismic surveys having wider spaced grids but which provide spatial resolution equivalent to a narrower grid. Furthermore, it is highly desirable to have a method for performing seismic surveys which for a given equipment provides flexibility with the bin size without compromising spatial resolution and without increasing operational cost.

The present invention provides a method for performing seismic surveys which addresses the above-noted problems. The method provides smaller or fractional bins compared to the bins obtained using conventional methods, provides flexibility of manipulating bin sizes and enables the use of differently spaced receiver and source lines for performing seismic surveys.

SUMMARY OF THE INVENTION

This invention provides a method of performing high resolution crossed-array seismic survey. A plurality of receiver lines, each having equally spaced receiver stations, are placed equidistant and parallel from each other. Seismic shock waves or energy pulses are generated at predetermined spaced-apart shot points along equally spaced source lines which are diagonal to the receiver lines. In one configuration, the receiver stations between adjacent receiver lines are staggered (offset) by a fraction of the receiver spacing or the source stations between adjacent source lines are offset by a fraction of the source station spacing or both the receivers and the source stations are offset to obtain a desired spatial sampling (number of bins), each bin associated with one common mid point. A seismic source is energized at the source stations to produce seismic pulses and the returning seismic pulses from the substrata are detected by the receiver stations, which are then recorded and processed. This configuration provides a crossedarray seismic survey geometry, wherein the receiver stations between adjacent receiver lines and/or the source stations between adjacent source lines are offset and it provides higher spatial sampling (smaller bins) compared to the crossed-array survey geometries having no offsets.

In an alternate embodiment, no offset is provided between the receiver stations or the source stations, but the smaller bins are obtained by adjusting either the receiver line spacing or the source line spacing or both. The receiver line spacing is made equal to an integer and a fraction times the source station spacing and/or the source line spacing is made an integer and a fraction times the receiver station spacing. The fractional offset provide the spatial sampling Coin size). This configuration provides higher spatial sampling (smaller bins) compared to the conventional geometries.

The smaller bins may be combined to obtain folds (multiplicity) which is sufficient to provide desired seismic imaging while preserving the benefits provided by the higher spatial sampling by the method of the present invention.

Examples of the more important features of the invention thus have been summarized rather broadly in order that derailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein.

DETAILED DESCRIPTION OF THE PRESENT INVENTION

Figure 1:
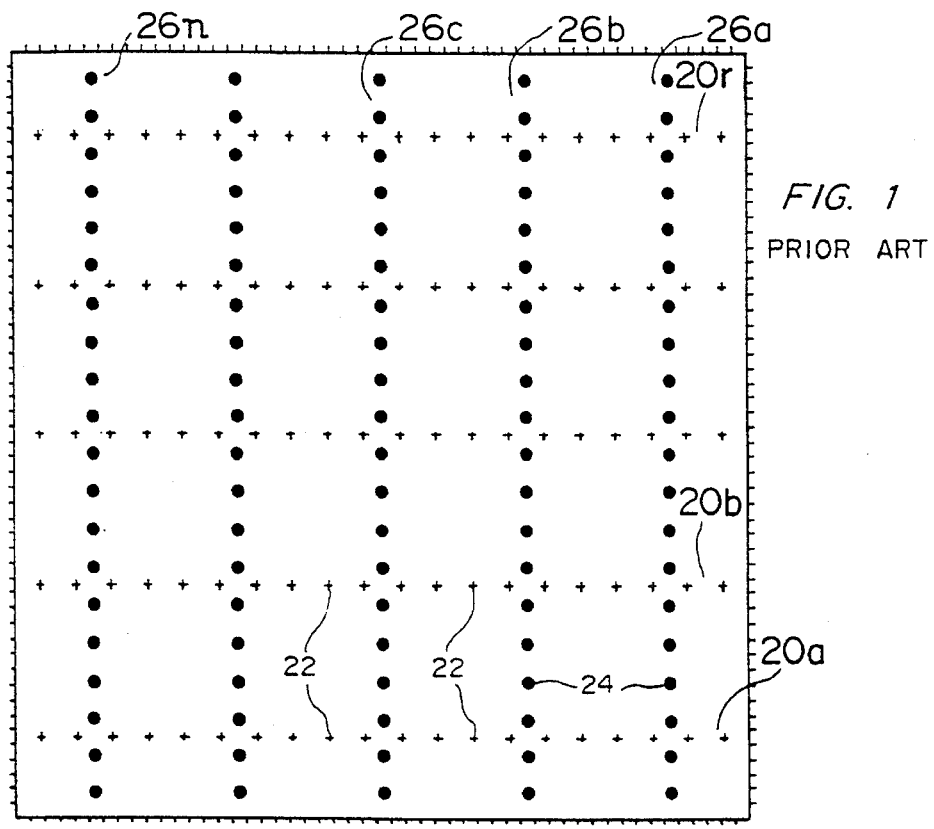
FIG. 1 shows a prior art seismic survey geometry of receivers and source points.
Figure 1A:
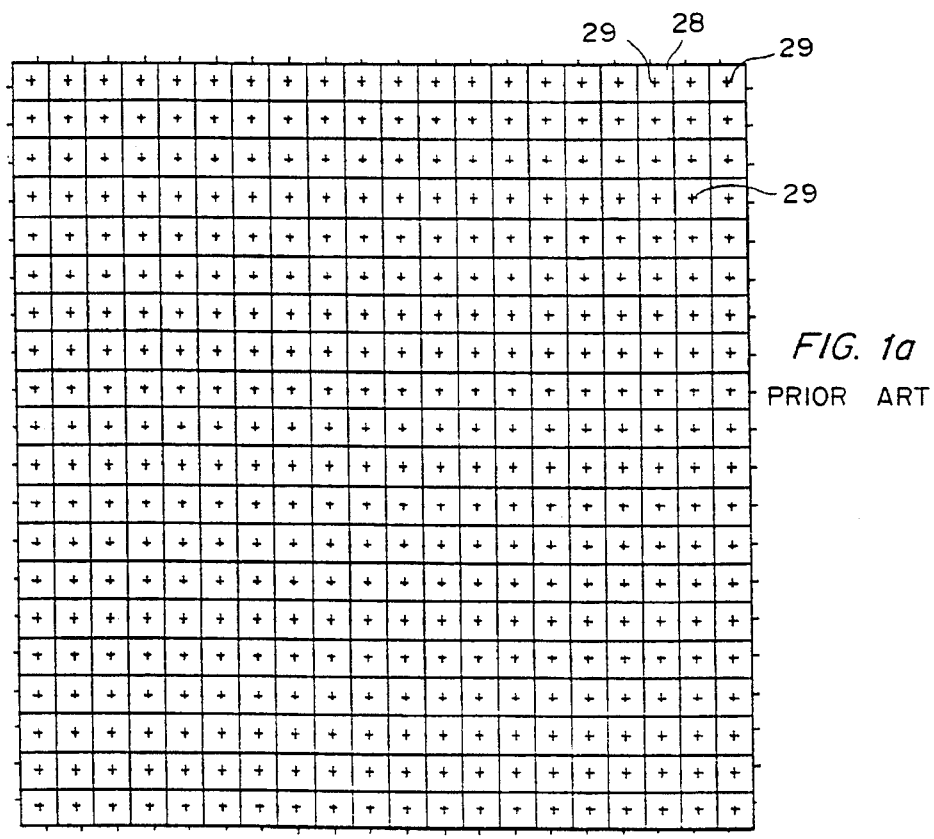
FIG. 1A shows the common midpoint bin sizes which result when the survey geometry of FIG. 1 is used.

As noted earlier, FIG. 1 shows a typical prior art seismic survey geometry of receivers and shot points. FIG. 1A shows the bin sizes for common midpoints that result from the configuration of FIG. 1.

In the present invention, smaller bin sizes compared to the bin sizes of the conventional seismic geometry (utilizing the same receiver station spacing and the same source stations spacing) is obtained by staggering (offsetting) the receiver stations between adjacent receiver lines, or by staggering source stations (source points) between adjacent source lines, or by staggering receiver line spacing relative to the source stations or by staggering source line spacing relative to the receiver stations or by using a combination of the above.

It is considered helpful to explain the survey geometries of the present invention by way of specific examples. It will, however, be understood that these examples are used herein to aid the reader in understanding the present invention and are not used as limitations.

Figure 2:
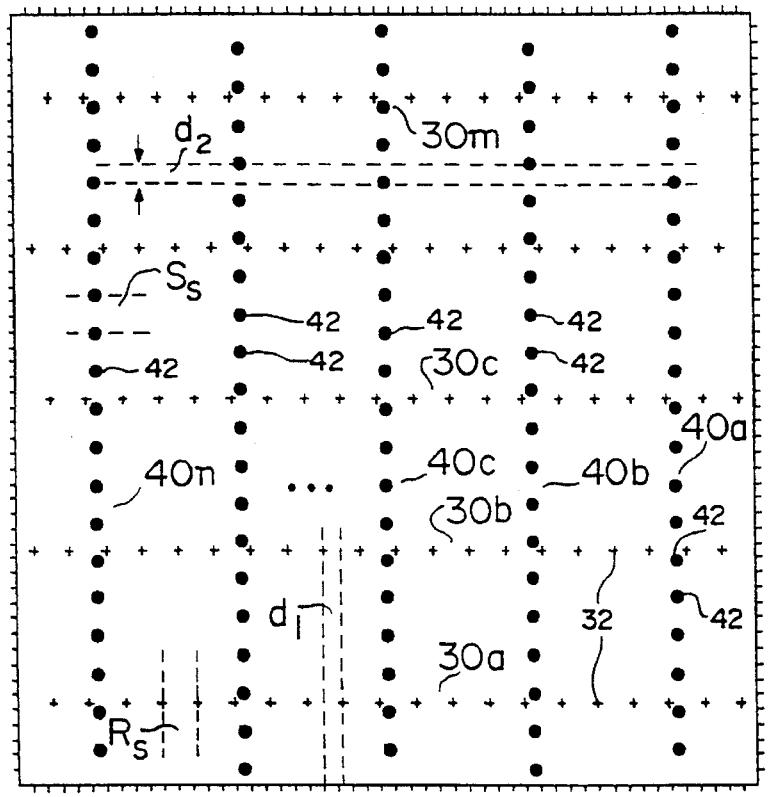
FIG. 2 shows a seismic survey geometry of receivers and shot points according to the present invention.

FIG. 2 shows an example of a survey geometry according to the present invention wherein both the receiver stations and the shot stations are staggered to provide smaller bins compared to the standard bin. A plurality of receiver lines 30a, 30b . . . 30m are placed in parallel on the terrain to be surveyed. Each receiver line has a plurality of spaced apart receiver 32. The spacing Rs between adjacent receivers on the receiver lines is the same. However, the receivers between adjacent receiver lines are staggered (offset) by a predetermined distance $d1 = 1/j$ (Rs), where j is an integer greater than or equal to two (2). For simplicity and convenience, in FIG. 2j=2, i.e., the receiver stagger is one-half (½) the distance between adjacent receivers. Staggering the receivers produces multiple common midpoints along the x-axis, such as shown by 45, in FIG. 2A. In general, staggering the receivers by 1/j the receiver spacings provides j common midpoints along the x-axis for each standard bin. Thus, in FIG. 2, staggering the receiver between adjacent receiver lines by one-half (½) the receiver spacing provides two (2) common midpoints for each standard bin. Similarly, staggering receivers by one-third, the receiver spacing will provide three common midpoints. FIG. 2 shows a plurality of source lines by 40a, 40b . . . 40n. Each such source line shows a plurality of source stations 42. The spacing Ss between adjacent source stations along the source lines is the same. However, the source stations are staggered by a distance $d_2 = 1/k$ (Ss), where k is an integer greater than or equal to two (2). For simplicity and convenience, the source station stagger in FIG. 2 is shown to be one-half (½) the distance between adjacent source stations. Staggering the source stations produces multiple common midpoints along the x-axis, such as shown by 46, in FIG. 2A. In general, staggering the source stations by 1/k the source station spacing Ss provides k common midpoints along the y-axis. Thus, in FIG. 2, staggering the source station by one-half (½) the source station spacing provides two (2) common midpoints. Similarly, staggering source stations by one-third the source station spacing will provide three common midpoints. From the above explanation, it should be obvious that staggering receivers by 1/j the receiver spacing and staggering the source stations by 1/k the source station spacing provides j×k common midpoints for each standard cell.

Figure 2A:
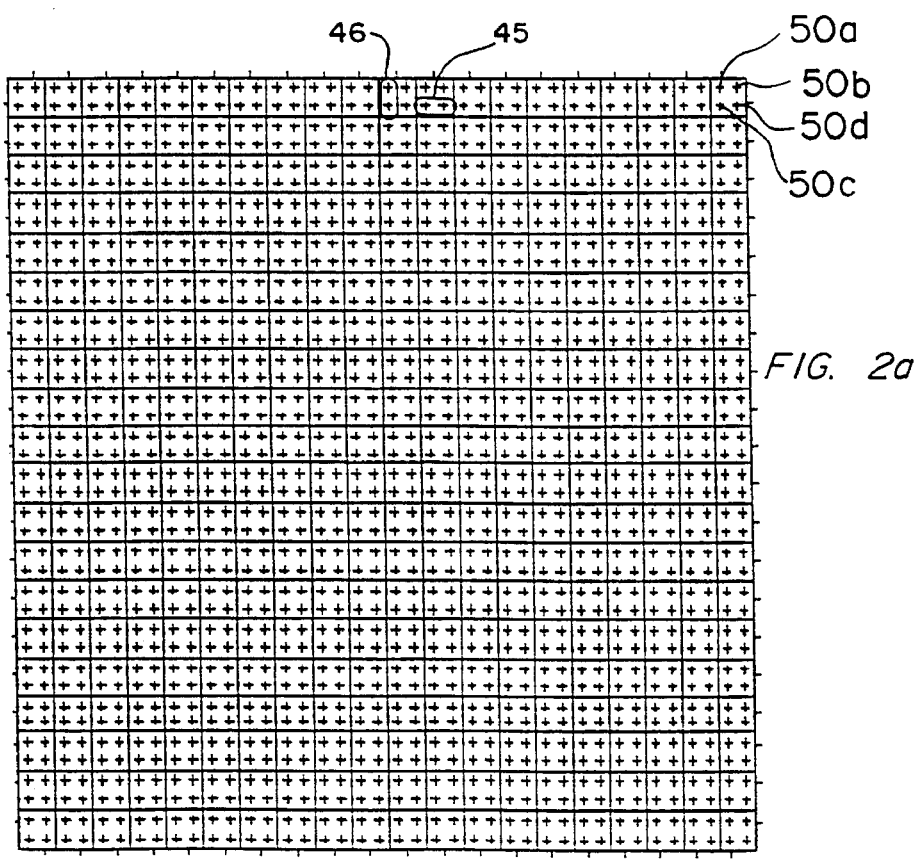
FIG. 2A shows the common midpoint bin sizes which result when the survey geometry of FIG. 2 is used.

FIG. 2A shows the common midpoints corresponding to the seismic survey geometry of FIG. 2. It provides four (j×k=4) common midpoints for each cell or bin compared to what is provided by survey from FIG. 1 for the same receiver and shot point spacings. In FIG. 2A, the bins corresponding to FIG. 1 ("standard cell") are outlined in solid boxes. Each such standard bin contains four midpoints 50a, 50b, 50c and 50d. This method maintains the trace sampling density of the prior art crossed-array geometry of FIG. 1, yet provides improved spatial sampling in each direction by a factor of two. Thus, using the seismic survey geometry of FIG. 2 allows binning the fold of a prior art cell into four (4) evenly spaced "quarter cells" or "quarter bins" sometimes referred to herein as "microbins", each microbin having dimensions of ½ standard bin×½ standard bin. It should be obvious that the time which it takes to perform a seismic survey using geometries of FIG. 1 and FIG. 2 is substantially the same. It should be noted that multiple midpoints to each standard bin may be obtained by staggering the receivers alone or by staggering the source stations alone.

The receiver line and spacing, number of receiver lines, and number of receivers in each line generally depend upon the equipment used to collect seismic data, terrain configuration, depth of target or multiple targets and economic considerations. In operation, the receiver lines are first placed as desired according to the method noted above. A source, such as a seismic vibrator or an explosive device, is then placed at the predetermined source stations 42, and activated. The source generates seismic pulses into the earth and are reflected by the substrata layers back to the earth's surface, where they are detected by the receivers 32. The receivers convert the received seismic waves into electrical signals, which are transmitted to recording and processing equipment (not shown). After all the data has been recorded corresponding to a source point, the source is moved to the next source point along the source line. When the source is activated, each receiver records data corresponding to the midpoint between the source and the receiver, thereby providing data for a row of common midpoints for each receiver line. When the source is moved to the next source point, the receivers record data for some new common midpoints and for some of the previously recorded common midpoints, thereby providing overlapping data. The data belonging to the same common midpoint is combined by known methods in the art of seismic prospecting to obtain the seismic trace corresponding to each such common mid point. The source is then moved to the next source point and the above process is repeated until the entire terrain has been surveyed.

Figure 3:
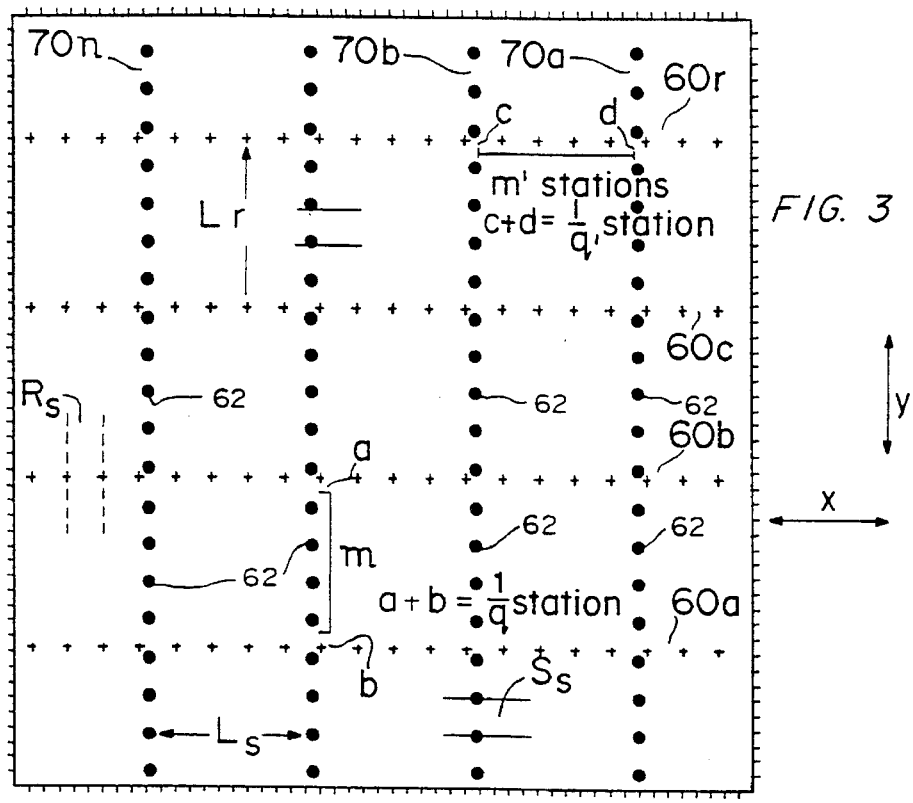
FIG. 3 shows an alternate seismic survey geometry of receivers and shot points according to the present invention.

FIG. 3 shows another example of the seismic survey geometry according to the present invention. In this configuration, both the receiver lines and the source lines are staggered by predetermined distances. A plurality of receiver lines 60a–60r, each receiver line containing a plurality of equally spaced (Rs) receiver stations, are placed in parallel. The receiver stations between the receiver lines are aligned, as in the prior art FIG. 1. The source lines 70a–70n are shown diagonal to the receiver lines. The spacing Ss between adjacent source stations is the same. The source stations 62 are aligned in the receiver line direction. The spacing Lr between adjacent receiver lines is a function of the source station spacing Ss and may be expressed as Lr=(m+1/q) Ss, where m is an integer and q is an integer greater than or equal to two (2). The fraction q defines the stagger, which is evenly divided between the source station and the receiver lines as shown by "a" and "b" in FIG. 3. In the example of FIG. 3, m=4 and q= 2, i.e, the receiver line spacing is 4 ½. The number of common midpoints corresponding to the receiver line offset equals q in the x- axis. Thus, there are two (2) common midpoints associated with the receiver line offset in FIG. 3. In order to obtain multiple midpoints in the y-axis, the source lines may similarly be staggered. The source line spacing Ls may be expressed as Ls=(m'=1/q') Rs, where m' is an integer, q' is an integer greater than or equal to (two) and Rs is the receiver spacing. The number of midpoints associated with such a source line spacing is q' along the y-axis. In FIG. 2, m'=4 and q'=2. There are two common midpoints associated with the source line offset. The total number of mid points associated with the source line and receiver line spacing stagger will be the product of q and q'. Thus, FIG. 3 provides four (4) common midpoints for each standard bin. It should be noted that multiple common midpoints may be obtained by staggering the receiver lines alone or by staggering the source lines alone.

Figure 3A:
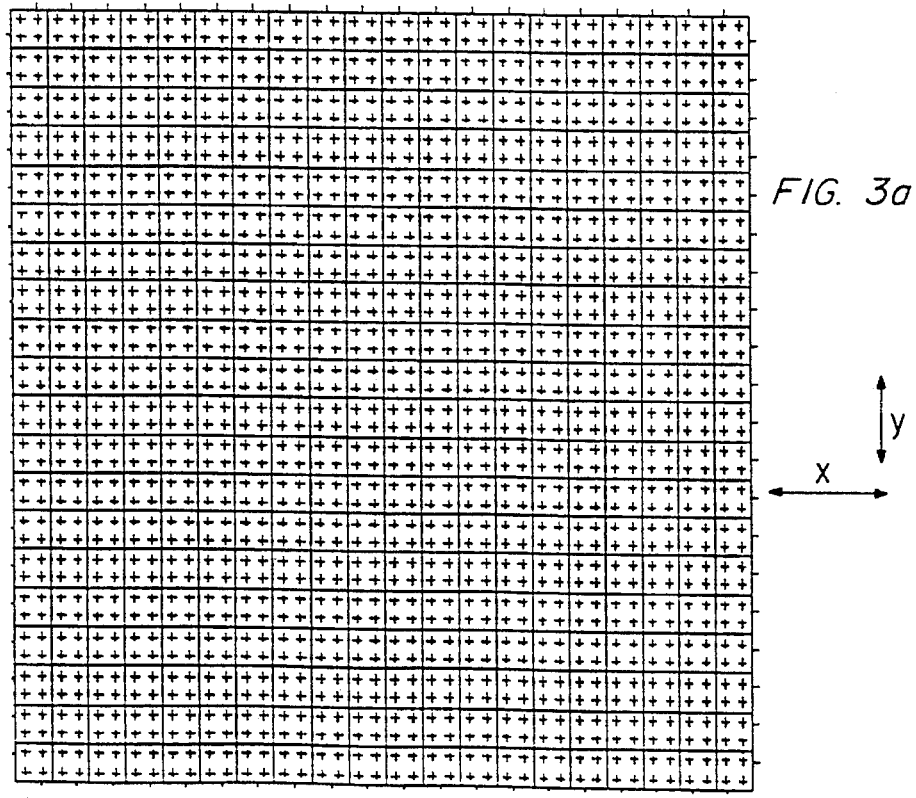
FIG. 3A shows the common midpoint bin sizes which result when the survey geometry of FIG. 3 is used.

FIG. 3A shows the common midpoints associated with the seismic survey geometry of FIG. 3. Each standard bin is shown by the solid lines and each such bin contains four common midpoints. It will be obvious that by choosing different values of q and or q', the microbin size may be altered.

It will be obvious from the above examples that many combinations of survey geometries may be obtained by staggering the receivers, source stations, source line spacing and receiver line spacing. Thus, by manipulating the seismic survey geometry in accordance with this invention, seismic traces for a plurality of midpoints for each standard cell may be obtained.

It is known in the art of seismic prospecting that the cell size determines the spatial frequency. Thus, the smaller the cell size, the higher the spatial frequency. It is also known in the art that higher spatial frequency provides higher resolution of the seismic data, which is highly desirable, especially for three dimensional surveys. The quality of the resultant stratigraphical information depends upon the useful information that can be recovered from the data. Nyquist frequency also called the "folding frequency" associated with the sampling interval (spatial sampling) defines the amount of useful information that can be referred from the data. Nyquist frequency is defined as one half the spatial frequency, i.e., n=½ (spatial sampling). Frequencies greater than the Nyquist frequency alias as lower frequencies (fold into lower frequencies), from which they are indistinguishable. Thus, the information contained beyond the Nyquist frequency is not recovered for data processing purposes and is lost. Thus, smaller cell size (higher spatial sampling frequency), allows recovery of more useful information from the data, thereby improving the resolution of the seismic data.

As discussed above, the exemplary survey geometries of FIGS. 2 and 3 provide cells which are one-half the dimensions of the standard cell. Thus, the Nyquist frequency corresponding to the geometries of FIGS. 2 and 3 is twice that associated with FIG. 1, the geometry of which allows recovery of substantially more information from the data as compared to the standard bin. Also, it is known in the art that lower midpoint multiplicity in the microbins provide lower signal to noise ratio when the data associated with a common midpoint is stacked. However, the number of traces (trace density) is identical in both cases. Macrobinning the same number of traces as in the standard cell allows one to obtain a signal to noise ratio equivalent to that of the standard cell and also allows one to preserve the benefits of higher spatial sampling for input to migration, which is a well known processing technique in the art of seismic data processing. Smaller cells obtained by the method of the invention allows combining bins (macrobinning) at intervals which are not otherwise available when survey is performed using standard cell geometry. Such macrobinning further allows to output seismic traces at microbin spacing when overlapping cells are used to macrobin. This results in improved spatial response, which enhances the quality of information because it prevents high frequency aliasing in migrating steep dip data and further aids in better stratigraphic interpretation.

Additionally, macrobinning smaller cells obtained from the method of this invention allows filling of the offset deficiencies, which improves the normal moveout stack response, which aids in reducing or eliminating coherent noise, such as ground roll and seismic multiples.

The foregoing description is directed to a particular methods of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein the positions of said source locations within succeeding source lines of a series of said source lines in positional order are offset from said source locations within the preceding source lines by a fraction of said spacing between adjacent source locations within said source lines, where said fraction is of the form 1/j, where j is an integer.

2. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein the positions of said receiver locations within succeeding receiver lines of a series of said receiver lines in positional order are offset from said receiver locations within the preceding receiver lines by a fraction of said spacing between adjacent receiver locations within said receiver lines, where said fraction is of the form 1/k, where k is an integer.

3. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein the positions of said source locations within succeeding source lines of a series of said source lines in positional order are offset from said source locations within the preceding source lines by a fraction of said spacing between adjacent source locations within said source lines, where said fraction is of the form 1/j, where j is an integer;

and the positions of said receiver locations within succeeding receiver lines of a series of said receiver lines in positional order are offset from said receiver locations within the preceding receiver lines by a fraction of said spacing between adjacent receiver locations within said receiver lines, where said fraction is of the form 1/k, where k is an integer.

4. A method of performing a seismic survey, comprising the steps of:

inducing seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein said spacing between said receiver lines is a factor times said spacing between said source locations along said source lines, where said factor is of the form $(m+1/j)$, where m is an integer and j is an integer.

5. A method of performing a seismic survey, comprising the steps of:

inducing seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein said spacing between said sources lines is a factor times said spacing between said receiver locations along said receiver lines, where said factor is of the form $(n+1/k)$, where n is an integer and k is an integer.

6. A method of performing a seismic survey, comprising the steps of:

inducing seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines, wherein said spacing between said receiver lines is a first factor times said spacing between said source locations along said source lines, where said first factor is of the form (m+1/j), where m is an integer and j is an integer, and said spacing between said sources lines is a second factor times said spacing between said receiver locations along said receiver lines, where said second factor is of the form (n+1/k), where n is an integer and k is an integer.

* * * * *